UNITED STATES PATENT OFFICE.

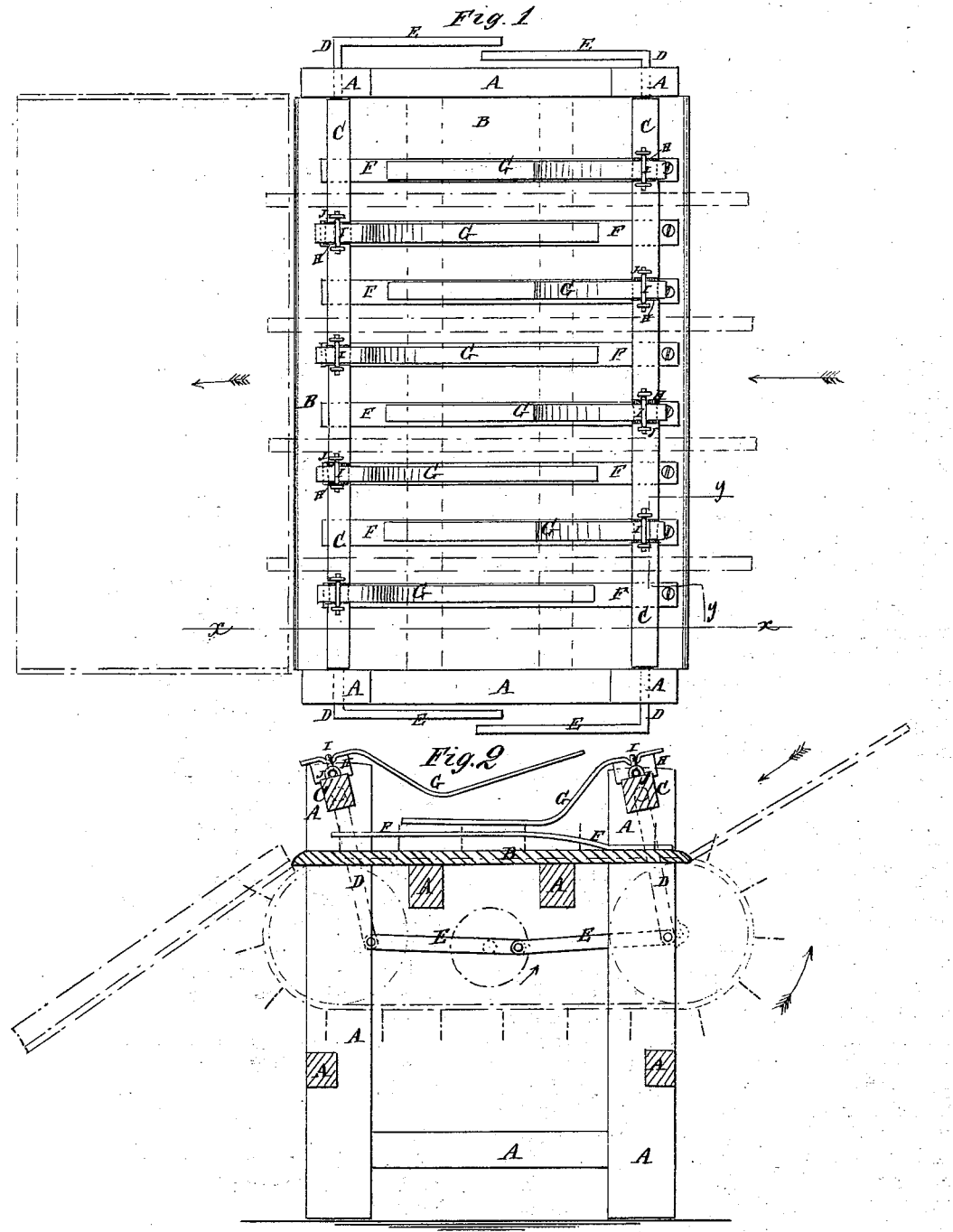

WILLIAM CHRISTIE, OF HACKENSACK, NEW JERSEY.

IMPROVEMENT IN THRASHING-MACHINES.

Specification forming part of Letters Patent No. 153,745, dated August 4, 1874; application filed February 21, 1874.

*To all whom it may concern:*

Be it known that I, WILLIAM CHRISTIE, of Hackensack, in the county of Bergen and State of New Jersey, have invented a new and useful Improvement in Flail-Thrasher, of which the following is a specification:

Figure 1 is a top view of my improved machine. Fig. 2 is a detail vertical section of the same taken through the line $x\ x$, Fig. 1. Fig. 3 is a detail section taken through the line $y\ y$, Fig. 1.

Similar letters of reference indicate corresponding parts.

My invention has for its object to improve the construction of the flail-thrasher for which Letters Patent No. 104,503 were granted to William Schnebley, June 21, 1870, so as to make it more effective and reliable in operation, and less liable to get out of order. The invention consists in the spring-bars and the rigid yielding flails in combination with the rock-shaft, floor, and frame of the machine, and in the combination of the springs, yokes, and eyebolts with the flails and rock-shafts, as hereinafter fully described.

A represents the frame-work of the machine, to which is attached the floor or table B, upon which the grain is laid to be thrashed, and which should have holes formed through it for the grain to escape through. To the frame A, at such a distance above the floor B as to give sufficient space for the passage of the unthrashed grain and the straw, are pivoted two rock-shafts, C, to the ends of which are attached cranks D, to which are pivoted connecting-rods E, to which power is applied in the manner described in Letters Patent No. 104,503. F are spring-bars, the rear ends of which are attached to the floor B, near its rear edge, and which are so formed as to stand up a little from the floor B, as shown in Fig. 2. G are the flails, which are rigid bars, and which are so formed as to strike squarely upon the grain as it lies upon the spring-bars F. The outer ends of the flails G rest upon springs H of rubber or metal, and are concaved above said springs H to receive the yokes I, to prevent them from slipping out of said yokes when in operation. The ends of the yokes I are bent outward, and pass through the eyes of the eyebolts J, attached to the rock-shafts C. By this construction the flails G will come down upon the straw with a whip-blow, and will yield to accommodate themselves to the varying thickness of the straw, so that the grain may be thrashed when thin as well as when thick. The unthrashed grain is carried in beneath the flails G, and the straw is carried out by spiked belts, in the manner described in Letters Patent No. 104,503. The flails G are so arranged as to strike the grain directly above the spring-bars F, and said bars and flails should be so close together as to thrash out all the grain from the straw. With this construction the straw comes straight and whole from the machine, and may be readily bound into bundles.

Having thus described my invention, I claim as new and desire to secure by Letters Patent—

1. The spring-bars F upon floor B, in combination with yielding flails G, rock-shafts C, and frame A of the machine, substantially as herein shown and described.

2. The combination of the springs H, yokes I, and eyebolts J with the flails G and rock-shafts J, substantially as herein shown and described.

WILLIAM CHRISTIE.

Witnesses:
JAMES T. GRAHAM,
T. B. MOSHER.